United States Patent Office 3,825,456
Patented July 23, 1974

---

3,825,456
SPINNERETTE PLATES AND SPINNERETTE EMPLOYING SAME
William A. Weber and Edmund H. Wellech, Corning, N.Y., assignors to Corning Glass Works, Corning, N.Y.
Original application Sept. 30, 1970, Ser. No. 76,796, now abandoned. Divided and this application Oct. 16, 1972, Ser. No. 297,979
Int. Cl. C03c 15/00
U.S. Cl. 156—15                                          4 Claims

ABSTRACT OF THE DISCLOSURE

Holes in a pattern desired for a spinnerette are etched through each of a plurality of flat and relatively thin disks of a photosensitively opacifiable glass each having a peripheral configuration corresponding to that of a spinnerette or spinnerette plate to be formed from the disks. The etched holes in each of the disks are of the same size but differ in size from some of the disks to others thereof so that such disks can be stacked to subsequently form a homogenous body or spinnerette plate having holes extending therethrough and generally conforming to the outer configuration of each of a plurality of spinnerette capillary members which are formed of a thermally crystallizable glass and which are subsequently inserted in the holes. The disks and capillary members are exposed to short wave radiations such as rays of ultraviolet light and the assembly, comprising the disks and spinnerette capillary members, are subsequently subjected to a heat and pressure cycle to fuse the disks to each other and to the capillary members and, simultaneously therewith, convert the assembly to a ceramic body to provide a ceramic spinnerette of a very strong, durable and corrosion resistant material, and embodying spinnerette capillaries having very smooth sidewalls extending through the spinnerette.

---

This is a division of our copending application Ser. No. 76,796, filed Sept. 30, 1970, now abandoned.

BACKGROUND OF THE INVENTION

Because of the high corrosion resistance as well as the durability and strength of ceramic bodies, it has been recognized for a substantial period of time that a spinnerette comprising a ceramic body would be very ideal. Accordingly, wires were embedded, in a desired pattern for the capillaries of a spinnerette, in a molten body of a glass composition which is capable of later being treated and subjected to a heat cycle or schedule to change the solidified glass body to a ceramic body. The wires were then etched out of the solidified glass body by a suitable etchant and the glass body subsequently converted to a ceramic body in the manner stated to produce a spinnerette having holes or capillaries extending therethrough in said pattern of said wires. However, the sidewalls of the holes or spinnerette capillaries in the spinnerette were not sufficiently smooth for the spinnerette so produced to receive general acceptance by artificial filament manufacturers.

It was also proposed to mask, in a desired pattern of spinnerette capillaries, one surface of a plate of photosensitively opacifiable glass, either by a photographic negative of said pattern or by a suitable photoresist masking technique to provide said pattern, and to then subject the masked surface of the plate to rays of ultraviolet light to irradiate the unmasked portions defining said pattern on said surface and render such portions capable of heat-developed opacification. In trying such a method, said unmasked portions were opacified in the manner stated and subsequently subjected to a suitable etchant to dissolve the opacified portions of the glass plate and provide holes or spinnerette capillaries extending through the plate in the desired pattern therefor. However, the plates produced by such method were also unsatisfactory for spinnerettes because, as in the previously described and attempted method, the sidewalls of the holes or spinnerette capillaries were not sufficiently smooth. Also, spinnerettes must be relatively thick to withstand the pressures to which they are subjected during their intended use and, in etching plates of the required thickness by using the masking technique, intolerable or unacceptable so-called "etch undercutting" in the holes or capillaries in the plates was found to exist.

Accordingly, it is an object of the present invention to provide spinnerette plates for supporting spinnerette capillary members having extremely smooth inner sidewalls extending therethrough, such plates comprising assemblies of a photosensitively opacifiable glass.

It is an other object of the present invention to provide a ceramic spinnerette having capillaries with extremely smooth sidewalls of a desired shape extending therethrough, such spinnerette having high mechanical strength and durability, and a very high resistance to corrosion by corrosive materials.

SUMMARY OF THE INVENTION

In accomplishing the foregoing objects in accordance with the preferred embodiment of the invention, there is provided a plurality of flat and relatively thin disks of a photosensitively opacifiable glass each of which is provided with an identical pattern of holes etched through the respective disk but the holes in some of such disks differing in size from the holes in other of such disks. Each of the plurality of said disks are exposed to short wave radiations and the disks are then stacked to form a spinnerette plate assembly having holes extending therethrough and generally conforming to the outer configuration of spinnerette capillary members which are preferably but not necessarily made of the same type of glass as the plates and which are subsequently inserted in said holes in the plates to provide a spinnerette body or assembly. Such spinnerette body or assembly, comprising the disks and capillary members, are then subjected to a pressure and heat cycle to convert the entire assembly to a ceramic assembly and to fuse the parts of the assembly to each other to provide a substantially homogenous ceramic spinnerette having the aforesaid characteristics of durability, mechanical strength and corrosion resistance.

BRIEF DESCRIPTION OF THE DRAWINGS

In the drawings.

Similar reference characters refer to similar parts in each of the figures of the drawings.

PREFERRED EMBODIMENTS OF THE INVENTION

Figure 1:
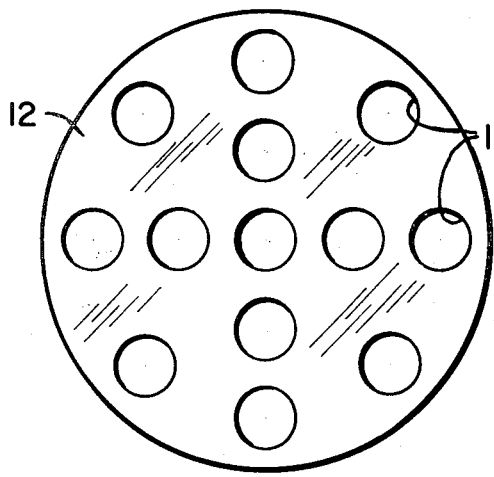
FIG. 1 is a top plan view showing a disk which may be used in practicing the invention and which has holes of a first size extending therethrough in a selected pattern.

Referring to the drawings in detail, there is shown in FIGS. 1 through 4 a plurality of flat and relatively thin disks such as 12, 13 and 14 having holes such as 12a, 13a and 14a, respectively, extending therethrough. Such disks are formed of a photosensitively opacifiable glass which may comprise a glass composition such as disclosed, for example, in U.S. Pat. 2,684,911 or 2,971,853, issued July 27, 1954 and Feb. 14, 1961, respectively, to Stanley D. Stookey. The holes through disks 12, 13 and 14 may, for example, be provided in such disks by either of the following described so-called "sculpturing" techniques.

One surface of each said disk is masked with a photographic negative having clear areas defining the size and pattern of the desired holes in the respective disk. Such masked surface of the disk is then exposed to short wave radiations, such as ultraviolet radiations, to cause the irradiated areas of said surface in said pattern of holes and the internal regions of the disk therebeneath to change so that they are capable of heat developed opacification. The disks are then subjected to a heating cycle to bring about said opacification of said areas and regions in said pattern of holes, and are then subjected to or treated with a suitable etchant such as a dilute aqueous solution of hydrofluoric acid which etches said holes through each respective disk in said desired pattern. Reference is made to U.S. Pat. 2,628,160, issued Feb. 10, 1953 to Stanley D. Stookey for further details of the method of providing said holes in said disks, if such details are desired.

The other method of providing said holes in said disks is similar to that described above except that, in the place of masking the surface of said disks with photographic negatives, a photoresist masking technique is used to provide the desired pattern of holes on the surface of the disks. Such photoresists and masking techniques are now well known in the art and, therefore, no detailed discussion of the photoresist masking techniques is considered necessary.

Figure 2:
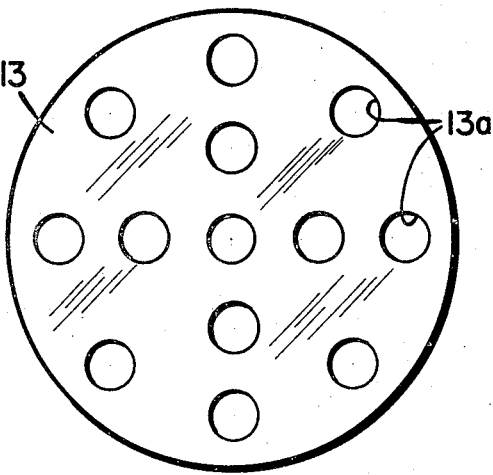
FIGS. 2 and 3 are views, similar to FIG. 1, showing second and third disks which may be used in practicing the invention, such disks having holes of second and third sizes, respectively, extending therethrough in said selected pattern.
Figure 3:
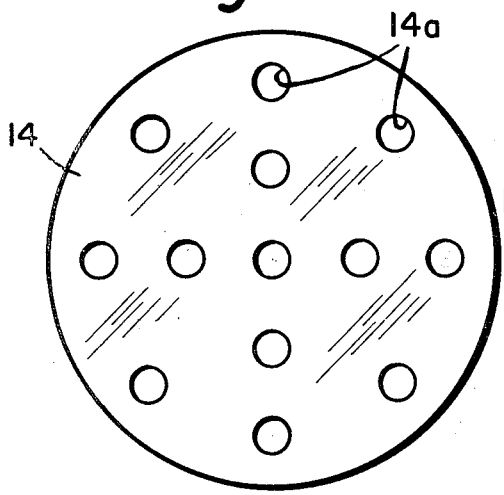

As an example of the making of a spinnerette plate embodying the invention, a plurality of five disks, such as 12 and having holes 12a of the size such as illustrated in FIG. 1 of the drawings is provided by one of the previously discussed so-called sculpturing techniques. Another disk such as 13 and having holes such as 13a of the size such as illustrated in FIG. 2 is also provided, the pattern of such holes in disk 13 being similar to the pattern of holes provided in the disks such as 12. A third disk such as 14 and having holes such as 14a of the size such as illustrated in FIG. 3 is also provided, the pattern of such holes in disk 14 being similar to the pattern of holes provided in the disks such as 12 and 13.

Figure 4:
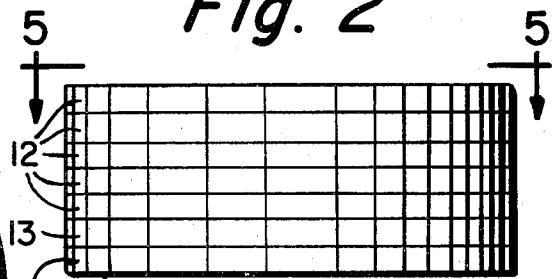
FIG. 4 comprises an elevational view illustrating a plurality of the disks of FIGS. 1, 2 and 3 in a stacked relationship with each other to provide a stacked assembly of said disks.
Figure 5:
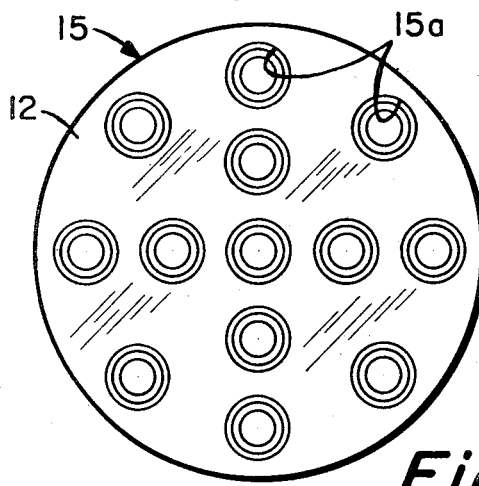
FIG. 5 is a top plan view for the stacked assembly of disks shown in FIG. 4, such view being taken generally along line 5—5 of FIG. 4 and illustrating sets of corresponding holes of different sizes extending through the stack of disks in a concentric relationship with each other.

Said disks 12, 13 and 14 are each first exposed or subjected to short wave radiations, such as rays of ultraviolet light, and the disks are then stacked one on top of another to form a stacked assembly of disks 15 with the five disks such as 12 being uppermost and disks 14 being the lowermost in such stack as illustrated in FIG. 4. The disks are stacked so that the holes through such disks are concentric with each other as illustrated in FIG. 5, thereby providing holes such as 15a (FIG. 7) extending through such disks and which are graduated stepwise towards the lower ends thereof.

Figure 7:
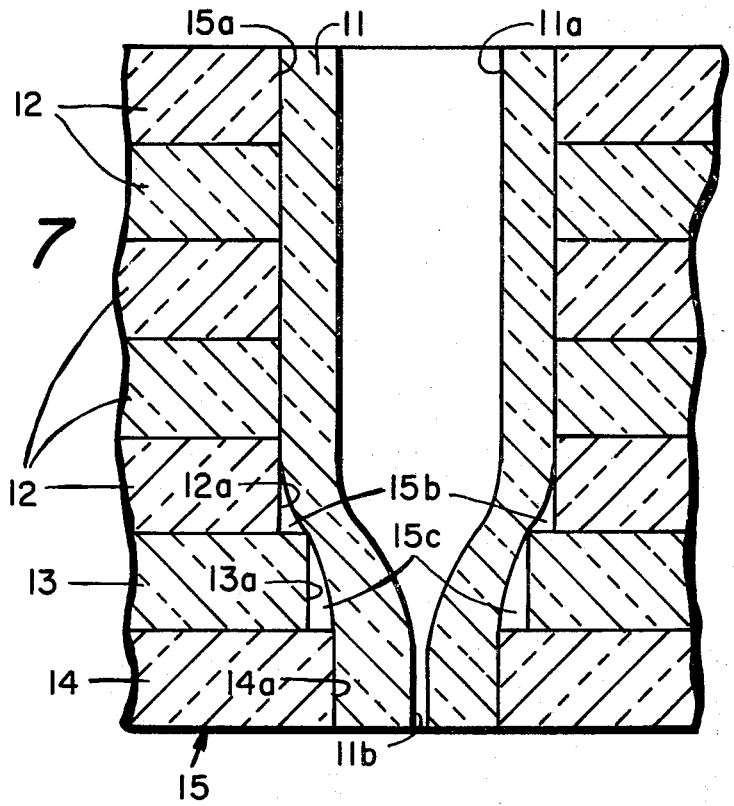
FIG. 7 is a fragmentary cross-sectional view of a portion of the stack of disks illustrated in FIGS. 4 and 5, such view being taken generally along line 7—7 of FIG. 6 and showing, in cross section, a spinnerette capillary member inserted in one of the sets of holes extending through the stack of disks.

It is believed expedient to point out at this point in the description that the size and shape of the holes provided in the disks such as 12, 13 and 14 may be selected with consideration to the thickness of each disk, in accordance with the size and shape of a spinnerette capillary member, such as 11 shown in FIG. 7 and hereinafter further discussed, so that, when the disks are stacked as described, one of such capillary members may be inserted in each hole such as 15a extending through the stacked assembly of disks 15, each such capillary member fitting relatively snugly in its respective holes such as 15a as illustrated in FIG. 7. Under such conditions, the number and/or thickness of the disks employed to form the stacked assembly of disks 15 would, of course, depend on the length of the capillary members such as 11. Alternatively, the spinnerette capillary members such as 11 may be formed, in the manner hereinafter further discussed, so as to have a size and configuration corresponding to the holes such as 15a extending through a previously stacked assembly of disks such as 15 so as to fit relatively snugly in an associated one of said holes such as 15a in which each respective capillary member such as 11 is inserted or disposed.

The method of making the spinnerette capillary members such as 11 does not, per se, form a part of the present invention but the following brief description of one such method is set forth in order to make the specification complete.

A suitable length of tubing of a thermally crystallizable glass and preferably of the same glass composition or having substantially the same coefficient of thermal expansion as the composition of which the disks such as 12, 13 and 14 are formed, is heated and subjected to the now well-known and so-called redraw process to elongate the length of tubing and drawing it down until the hole or bore extending through the tubing is of a sufficiently small size for the outlet end or orifice of a spinnerette capillary member. As mentioned, the composition of said length of tubing need not necessarily be of the same glass composition as the disks such as 12, 13 and 14 but the glass forming the tubing should have a coefficient of expansion substantially equal to that of said disks. For example, such glass may have a composition such as disclosed in U.S. Pat. 2,920,971, issued Jan. 12, 1960 to Stanley D. Stookey.

Figure 8:
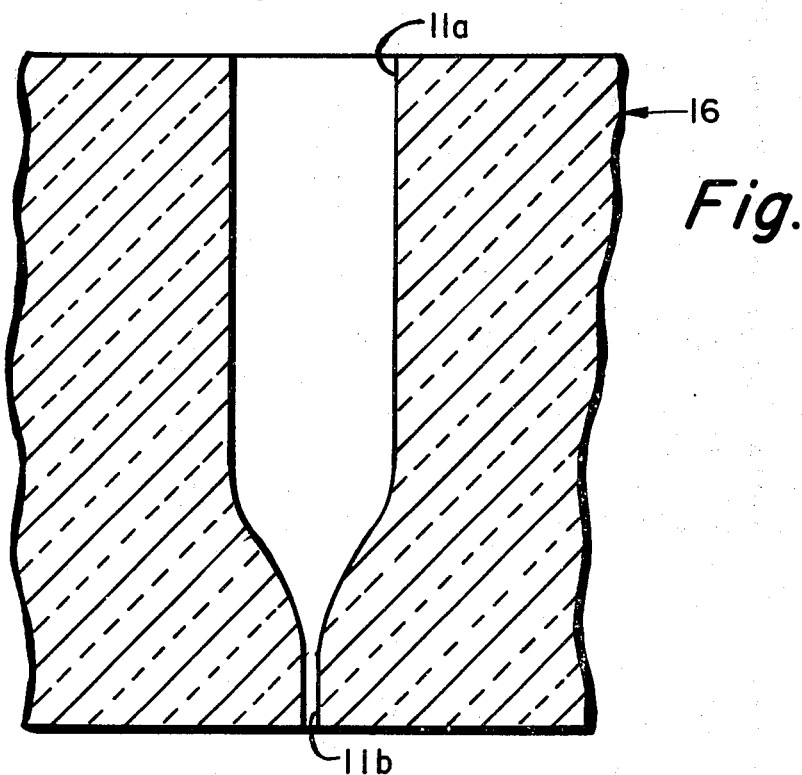
FIG. 8 comprises a view similar to FIG. 6 but illustrating said fragmentary cross-section of the stack of disks of FIGS. 4 and 5, and the embodied spinnerette capillary member, subsequent to the subjection of the assembly comprising the stack and its embodied capillary members to a heat and pressure cycle to change the assembly to a ceramic assembly and to fuse the various parts to each other to form an homogenous spinnerette assembly.

Following the above-mentioned redraw of the length of tubing, the redrawn tubing is cut into suitable lengths for handling, and one end of each such length of tubing is heated and pinched together to close at such end the bore of each respective tubing length which otherwise extends through the tubing length. Subsequent to said closing of the bore in each length of tubing, each respective such tubing length is heated, at a center section of the respective length, to the softening point temperature of the glass from which the tubing is formed and such heating is continued while said center section is rotated in a half or open-sided mold cavity corresponding in configuration to half of an enlarged tubing portion desired in said length of tubing. During said continued heating and rotation, compressed air is supplied through the remaining open end of the bore of each respective length of tubing to blow said heated center section into conformity with the shape of said open-sided mold cavity. Thus, lengths of blown tubing having enlarged portions, such as that of capillary member 11 shown in FIG. 7, are formed and embody an enlarged bore portion 11a. The lengths of blown tubing are then further cut to the lengths desired for the capillary members such as 11 embodying enlarged bore portion 11a and a spinnerette nozzle outlet or orifice 11b (FIGS. 7 and 8). The reforming of lengths of tubing in the manner just described and into desired shapes therefor is very old and well known in the art. Each of the capillary members, when made of a photosensitively opacifiable glass composition such as heretofore mentioned, is exposed to short wave radiations, such as rays of the ultraviolet light, and thereafter, are subjected to a heat cycle or schedule to convert the spinnerette capillary members to ceramic capillary members. Such heat cycles are now old and well known and, if further information is desired concerning the converting of bodies such as the spinnerette capillary members to ceramic members such as 11, reference is made to U.S. Pat. 2,971,853, issued Feb. 14, 1961 to Stanley D. Stookey. Alternatively, if the capillary members are made of a glass composition such as disclosed in the previously cited U.S. Pat. 2,920,971, the capillary members need not be exposed to short wave radiations but, as disclosed in such Pat. 2,920,971, the capillary members may be subjected to a heat cycle or schedule to convert them to ceramic capillary members.

In the preferred method of forming spinnerettes in accordance with the invention, a plurality of spinnerette ceramic capillary members are made in one of the two ways mentioned above and such members are put through a heat cycle or schedule to convert such members to spinnerette ceramic capillary members such as 11 as also mentioned previously. An assembly 15 of disks such as 12, 13 and 14 is provided, each such disk having been previously exposed to short wave radiations. One of said ceramic capillary members is inserted in each of the holes such as 15a extending through the assembly of disks and the composite thus formed is then subjected to a heat and pressure cycle to convert said disks to ceramic disks, and to fuse the disks and capillary members to each other to form a substantially homogenous ceramic spinnerette such as 16 illustrated in FIG. 8. Reference is again made to U.S. Pat. 2,971,853 for a suitable heat cycle for converting the spinnerette to a ceramic spinnerette.

In another method of forming spinnerettes in accordance with the invention, a stacked assembly 15 of said disks is provided and one of the spinnerette capillary members is then inserted in each of the holes through the stacked assembly. The assembly, including said disks and capillary members, is then suitably exposed to short wave radiations and, thereafter, subjected to a heat and pressure cycle to fuse said parts to each other while, simultaneously therewith, converting the assembly to a ceramic body to form a substantially homogenous ceramic spinnerette 16 such as shown in FIG. 8 of the drawings.

Figure 6:
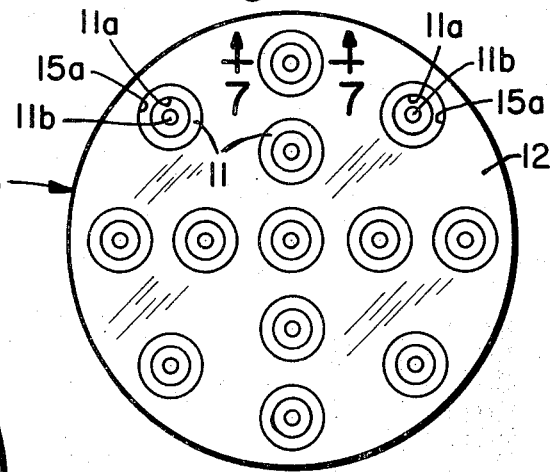
FIG. 6 comprises a top plan view of the stack of disks of FIGS. 4 and 5, and the embodied capillary members, subsequent to the insertion of a spinnerette capillary member in each of the sets of holes of the stack of disks.

It is pointed out that, although the nozzle outlets or orifices such as 11b of the spinnerettes are shown in FIGS. 6, 7 and 8 of the drawings as being circular in cross-section, such outlets may have other cross-sectional configurations. Such outlets may, for example, have a cross-sectional shape of a longitudinal slot with triangular flared or enlarged ends such as the orifices 11c shown in co-pending patent application Ser. No. 596,942, filed Nov. 25, 1966 by James W. Evans et al., now U.S. Pat. No. 3,620,703, such co-pending application being assigned to the same assignee as the present application. Furthermore, as another example, the nozzle outlets such as 11b may have outlines or cross-sectional shapes similar to those illustrated in FIGS. I, II, III, V and VII through XII of U.S. Pat. No. 2,945,739, issued July 19, 1960 to David J. Lehmicke for Process of Melt Spinning. It is also readily apparent that many other nozzle outlets or orifices of uncommon or unusual shapes and too numerous to be described can be provided in the spinnerette capillary members such as 11 of the present invention.

It will be understood that within the purview of the appended claims, various changes and modifications may be made in the practice of the methods disclosed herein, and in the spinnerettes and spinnerette plates formed by such methods, without departing from the spirit and scope of the claims.

We claim:

1. The method of making a ceramic spinnerette embodying capillaries with extremely smooth sidewalls, such method comprising;
   (a) providing a plurality of spinnerette capillary members formed of a thermally crystallizable glass and each having a selected and preferably symmetric configuration tapering towards the outlet end of the bore of the respective capillary member;
   (b) providing a plurality of thin and flat disks of a photosensitively opacifiable glass;
   (c) masking one surface of each said disk in a similar pattern of holes, such pattern leaving similar portions of each such surface exposed, each such exposed portion being similar in shape, and such portions on each respective disk being identical in size to each other and varying in size from at least some of the disks to others thereof;
   (d) exposing the masked surface of each said disk to short wave radiations and thereafter to a heat treating cycle to opacify in said pattern of holes said unmasked portions of each said surface and the regions therebeneath;
   (e) treating said masked surface of each said disk with an etchant to dissolve the opacified portions of each respective disk and provide holes extending through the respective disk in said pattern while leaving the clear portions of the respective disk substantially unchanged;
   (f) exposing each said disk to short wave radiations and then stacking a selected number of said disks with said holes therethrough in concentric relationship with each other and in an order such as to provide a stacked assembly of such disks having holes extending therethrough each of which at least partially graduates in size in stepwise fashion from one end of each respective hole towards the other end thereof to snugly receive one of said capillary members;
   (g) inserting an individual one of said capillary members in each of said holes extending through said stacked assembly of disks; and
   (h) subjecting the stacked assembly of disks and capillary members to a heat and pressure cycle to fuse the parts of the entire assembly to each other and make the entire assembly into said ceramic spinnerette.

2. The method in accordance with claim 1 and in which said capillary members are subjected to a heat schedule to make such members into ceramic capillary members prior to their insertion in said holes in said stacked assembly of disks.

3. The method in accordance with claim 1 and in which said thermally crystallizable glass of which said capillary members are formed is also a photosensitively opacifiable glass.

4. The method in accordance with claim 3 and in which said capillary members are exposed to short wave radiations and are then subjected to a heat schedule to make such members into ceramic capillary members prior to their insertion in said holes extending through said stacked assembly of disks.

References Cited
UNITED STATES PATENTS

| 3,492,523 | 1/1970 | Smith et al. | 156—24 X |
| 2,806,958 | 9/1957 | Zunick | 250—63 |
| 3,283,616 | 11/1966 | Balcenik et al. | 76—107 S |
| 3,279,284 | 10/1966 | Ogden et al. | 76—107 S |

OTHER REFERENCES

Webster's Seventh New Collegiate Dictionary, G. & C. Merriam Co., publishers, 1963, p. 136.

WILLIAM A. POWELL, Primary Examiner

B. J. LEITTEN, Assistant Examiner

U.S. Cl. X.R.

76—107 S; 156—16; 425—461